3,258,499
TREATMENT OF HEXACHLOROCYCLO-
PENTADIENE
Laurence S. Little, Niagara Falls, and Bernard A. Isroe, Tonawanda, N.Y., assignors to Hooker Chemical Corporation, Niagara Falls, N.Y., a corporation of New York
No Drawing. Filed Jan. 15, 1963, Ser. No. 251,472
5 Claims. (Cl. 260—648)

This invention relates to an improved process for the treatment of hexahalocyclopentadiene. More particularly, this invention is concerned with the utilization of an alkali metal carbonate to effect purification of hexachlorocyclopentadiene.

Hexachlorocyclopentadiene has utility as a pesticide, specifically, as a herbicide. Further, it can be reacted with other compositions to prepare insecticides. When it is utilized per se as a herbicide, the impurities present in the hexachlorocyclopentadiene will not harm its effectiveness.

When hexachlorocyclopentadiene is employed in preparing pesticides, the impurities present in the hexachlorocyclopentadiene may decrease the effectiveness of said herbicide. In the preparation of endosulfan, which is presented in detail below, it has been found that the Diels-Alder adduct prepared from hexachlorocyclopentadiene is frequently discolored, varying from a white to a dark brown, indicating the presence of impurities, so that an endosulfan of low purity results. This is true even though the hexachlorocyclopentadiene does not show any evidence of discoloration. One cannot determine from visual observation which hexahalocyclopentadiene will produce the discolored Diels-Alder adduct and the impurities in the hexachlorocyclopentadiene are not readily determinable.

The process of the instant invention has particular significance in purifying hexachlorocyclopentadiene for use in the preparation of 6,7,8,9,10-hexahalo-1,5,5a,6,9,9a-hexahydro - 6,9-methano-2,4,3-benzodioxathiepin-3-oxide hereinafter referred to as "endosulfan" for purposes of brevity.

The endosulfan may be represented structurally as follows

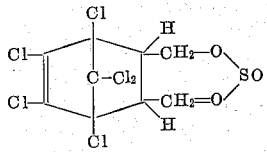

Endosulfan may be prepared according to the following equation (I)

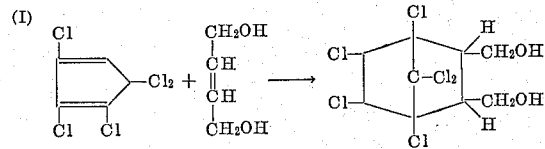

(II)

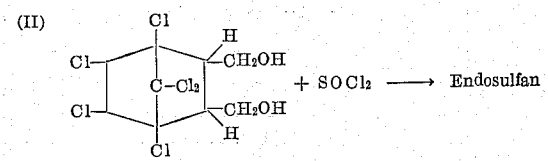

Details of the process are set forth in U.S. Patent 2,983,732.

In preparing the hexachlorocyclopentadiene for use in the above reaction, it has been the practice to treat said hexachlorocyclopentadiene with a mixed magnesium oxide. In some instances, this has proved to be reasonably effective, however, the results are not reproducible nor is it possible to predict the results if the removal of impurities has been effected. As a result, it has been found that in over 50 percent of the reactions, the resulting endosulfan produced does not meet purity specification.

The resultant Diels-Alder adduct, 1,4,5,6,7,7-hexachloro-2,3-bis(hydroxymethyl)-bicyclo-(2.2.1) - heptene-5 produced is frequently discolored, i.e. dark brown in appearance, indicating the presence of impurities. Therefore, when employing the dark colored adduct in the reaction of Equation II, above, an endosulfan of low purity results.

It is, therefore, an object of this invention to provide a method whereby hexachlorocyclopentadiene of a constant purity is produced.

Another object of this invention is to provide a method whereby hexachlorocyclopentadiene is conveniently and economically purified.

These and other objects will become apparanet from the detailed description presented herein.

The novel process of the instant invention comprises contacting hexachlorocyclopentadiene containing impurities resulting from its preparation with an alkali metal carbonate, the amount added being at least sufficient to give the desired purification and maintaining contact of the alkali metal carbonate with the hexachlorocyclopentadiene being purified for a time sufficient to cause purification of the hexachlorocyclopentadiene. Amounts in the range from about 40 to 60 moles of hexachlorocyclopentadiene to 0.2 to 0.3 mole of alkali metal carbonate are effective. It is to be appreciated that a greater or lesser amount can be utilized without departing from the scope of the invention.

Generally, it has been found that the reaction mixture may be reacted under a wide range of temperatures with no significance in the purification of hexachlorocyclopentadiene obtained. Accordingly, in the practice of the present invention, the purification of hexachlorocyclopentadiene is accomplished without any additional heating or cooling of the hexachlorocyclopentadiene either prior to or during the purification process. The process of the present invention is preferably accomplished at room temperature, 20-25 degrees centigrade. It will be appreciated that temperatures below room temperature may be used, however, this will increase reaction time. Further, it will be realized that any temperature would be used which may not be detrimental to purification process.

Pressures employed in the process of the instant invention are conveniently atmospheric, although super- or subatmospheric pressures may be employed without departing from the scope of the instant invention.

In a preferred embodiment, the instant invention is accomplished by contacting hexachlorocyclopentadiene with an alkali metal carbonate, preferably sodium carbonate, and maintaining contact of the alkali metal carbonate with the hexachlorocyclopentadiene being purified for a period of time sufficient to cause purification. The mixture is agitated during the purification and the hexachlorocyclopentadiene is separated from the impurities by filtration. Preferably, in order to complete a more rapid reaction of the hexachlorocyclopentadiene with the alkali metal carbonate, the materials are admixed prior to separation.

Generally, it has been found that the time to effect purification is from about 15 minutes to 1 hour. However, it is appreciated that the time can be less or greater.

Illustrative examples of alkali metal carbonates include the carbonates of sodium, potassium lithium, cesium, and rubidium.

Once the carbonate and hexachlorocyclopentadiene have been intimately admixed in desired period of time as indicated hereinabove, separation of the hexachlorocyclopentadiene from other substituents is effected. Preferably, separation is by filtration, although other methods, such as centrifuging, may be employed. Additionally, materials may be added with the alkali metal carbonate which will aid the separation, including filter aids such as diatomite (sold under the trade name of "Dicalite"). The only limitation on the type or quality of such material to be added is that it have no detrimental effect on the hexachlorocyclopentadiene or on the purification.

Up to the present time, it has not been possible to determine, with any degree of accuracy, the type or nature of the impurities in hexahalocyclopentadiene. Accordingly, the exact mechanism whereby the purification is accomplished is not fully understood.

It will be appreciated that the term "halo," as used in the specification is intended to include fluoro, chloro, bromo, and iodo. Because of low cost and ready availability, the preferred halo compounds are the chloro compounds, and for this reason primary reference will be made hereinafter to these compounds. This is to be taken as being exemplary of the present invention and not as a limitation thereon.

The hexahalocyclopentadiene purified in accordance with the instant invention may be prepared by reacting an aliphatic hydrocarbon containing at least 5 carbon atoms or an alicyclic hydrocarbon containing 5 carbon atoms in the ring, or the chlorinated derivatives of these compounds, with chlorine at temperatures between about 350 and 550 degrees centigrade. The 5 carbon atom alicyclic hydrocarbons having the 5 carbon atoms in the ring and 5 carbon atom aliphatic hydrocarbons wherein the number of carbon atoms in the longest straight chain is 4 or 5 are particularly suitable for the preparation of hexachlorocyclopentadiene in this manner. A detailed description of this method of preparing hexachlorocyclopentadiene is set forth in U.S. Patent 2,509,160 and it is, therefore, considered unnecessary herein to further describe its method of preparation. It should be understood, however, that this invention is not limited to any particular method of preparing that compound.

In order that those skilled in the art may better understand the present invention and the manner in which it may be practiced, the following specific examples are given.

*Example 1.*—40 pounds of sodium carbonate were mixed and stirred with ten pounds of Dicalite and 15,000 pounds of hexachlorocyclopentadiene prepared in accordance with the procedure set forth hereinabove, for approximately 30 minutes. The mixture was then filtered and pumped into a reaction. 265 pounds of epichlorohydrin were then added. The reactor contents were then heated at 152 degrees centigrade and 281 gallons of cis-2-butene diol-1,4 were added to the reactor over a period of approximately 4.75 hours. After cooling to about 25 degrees centigrade, the Diels-Alder adduct crystals are recovered. These crystals are then contacted with thionyl chloride in the presence of a solvent such as toluene. The endosulfan was recovered and on analysis was 98.8 percent pure.

The procedure of Example 1 is repeated several times with results comparable to those obtained in Example 1. The results obtained, in terms of the purity of the endosulfan obtained, were as follows:

*Example 2.*—99.2 percent.
*Example 3.*—98.4 percent.
*Example 4.*—98.2 percent.

*Example 5.*—The procedure of Example 1 is repeated with the exception that 40 pounds of magnesium oxide ("Maglite") are used in place of the sodium carbonate. Analysis of the endosulfan thus prepared shows a purity of 83.1 percent.

From a comparison of the results obtained in Examples 1–4 and Example 5 clearly shows the superior results obtained by the purification process of the present invention. These examples further show that these same superior results cannot be obtained when using magnesium oxide in place of the sodium carbonate.

While there have been described various embodiments of the invention, the methods and elements described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

We claim:
1. A process for the purification of hexachlorocyclopentadiene containing impurities resulting from manufacturing the hexachlorocyclopentadiene by reacting a compound selected from the group consisting of aliphatic hydrocarbons containing at least 5 carbon atoms, alicyclic hydrocarbons containing 5 carbon atoms in the ring, and chlorinated derivatives of such compounds, with chlorine, at a temperature between about 350 and 550 degrees, centigrade, which impurities result in the production of an endosulfan of low purity made from the hexachlorocyclopentadiene, which comprises contacting said impure hexachlorocyclopentadiene with an alkali metal carbonate and maintaining contact of the alkali metal carbonate with the hexachlorocyclopentadiene being purified for a period of time sufficient to cause purification of the hexachlorocyclopentadiene.

2. The process of claim 1 where tthe alkali metal carbonate is sodium carbonate.

3. The process of claim 1 wherein the hexachlorocyclopentadiene which has been treated with an alkali metal carbonate is separated by filtration, from the impurities.

4. The process of claim 3 wherein the mixture of hexachlorocyclopentadiene and alkali metal carbonate is agitated during the purification.

5. A process for the purification of hexachlorocyclopentadiene containing impurities resulting from manufacturing the hexachlorocyclopentadiene by reacting a compound selected from the group consisting of aliphatic hydrocarbons containing 5 carbon atoms, the longest straight chain of which is of 4 to 5 carbon atoms, alicyclic hydrocarbons of 5 carbon atoms and having said 5 carbon atoms in the ring, and chlorinated derivatives of such compounds, with chlorine, at a temperature between about 350 and 550 degrees, centigrade, which impurities result in the production of endosulfan of low purity made from the hexachlorocyclopentadiene, which comprises contacting from about 40 to 60 parts of hexachlorocyclopentadiene with from about 0.2 to 0.3 part of an alkali metal carbonate and maintaining contact of the alkali metal carbonate with the hexachlorocyclopentadiene for a period of time sufficient to cause purification of the hexachlorocyclopentadiene.

References Cited by the Examiner

UNITED STATES PATENTS

| | | | |
|---|---|---|---|
| 2,119,149 | 5/1938 | Bishop | 260—652 |
| 2,193,570 | 3/1940 | Seaton | 260—664 X |
| 2,273,905 | 2/1942 | Smith et al. | 260—327 |
| 2,471,274 | 5/1949 | Lingo | 260—327 |
| 2,724,730 | 11/1955 | Johnson | 260—648 |
| 2,732,409 | 1/1956 | Ladd | 260—648 |

LEON ZITVER, *Primary Examiner.*